US012748228B2

(12) United States Patent
Courtin et al.

(10) Patent No.: US 12,748,228 B2
(45) Date of Patent: Sep. 29, 2026

(54) VIBRATOR SOURCE BASEPLATE ERGONOMIC CONTROL

(71) Applicant: SERCEL, Carquefou (FR)

(72) Inventors: Maxime Courtin, Carquefou (FR); Cyrille Bernard, Saint-Philibert de Grand-Lieu (FR); Louis Guillou, Carquefou (FR)

(73) Assignee: SERCEL, Carquefou (FR)

( * ) Notice: Subject to any disclaimer, the term of this patent is extended or adjusted under 35 U.S.C. 154(b) by 674 days.

(21) Appl. No.: 18/325,384

(22) Filed: May 30, 2023

(65) Prior Publication Data

US 2024/0402370 A1 Dec. 5, 2024

(51) Int. Cl.

| | |
|---|---|
| ***G01V 1/09*** | (2006.01) |
| ***B60W 10/30*** | (2006.01) |
| ***B62D 1/12*** | (2006.01) |
| ***B62D 1/16*** | (2006.01) |
| ***G01V 1/047*** | (2006.01) |

(52) U.S. Cl.
CPC .............. *G01V 1/0475* (2013.01); *G01V 1/09* (2013.01); *G01V 2200/10* (2013.01)

(58) Field of Classification Search
CPC ........ G01V 1/047; G01V 1/0475; G01V 1/09; G01V 1/003; G01V 2200/10; B60N 2/797; B60N 2/75; B62D 1/16; B62D 1/18; B62D 1/12; B62D 1/14; B60W 10/00; B60W 10/04; B60W 10/30; E02F 9/20; E02F 9/2095; E02F 9/2025
See application file for complete search history.

(56) References Cited

U.S. PATENT DOCUMENTS 1,538,715 A * 5/1925 Mann ........................ B60Q 1/34 74/487
2,268,259 A * 12/1941 Mccarthy ............... B60Q 1/425 200/61.36
3,282,123 A * 11/1966 Klingaman ............ G05G 13/00 74/490.14
(Continued)

FOREIGN PATENT DOCUMENTS

CN 105676271 A * 6/2018 ................ B60T 7/12
CN 115267890 A * 11/2022 ............. G01V 1/143
EP 3637152 A1 4/2020

OTHER PUBLICATIONS

International Search Report/Written Opinion dated Sep. 18, 2024 in related/corresponding PCT Application No. PCT/IB2024/000252.

*Primary Examiner* — Edgardo San Martin
(74) *Attorney, Agent, or Firm* — PATENT PORTFOLIO BUILDERS PLLC

(57) ABSTRACT

A remote control system for a vibratory seismic source that generates seismic signals. The remote control system includes an attachment mechanism configured to be fixedly attached to a component of a vehicle carrier that carries the vibratory seismic source, and a remote control mechanism supported by the attachment mechanism, wherein the remote control mechanism includes first and second command units, each configured to control a baseplate associated with the vibratory seismic source. Each of the first and second command units are configured to be removed from the remote control mechanism while the attachment mechanism is hold in place.

18 Claims, 11 Drawing Sheets

(56) References Cited

U.S. PATENT DOCUMENTS 3,319,598 A * 5/1967 De Loreau ............. B60K 35/10 116/28.1
3,533,302 A * 10/1970 Hansen .................. B62D 1/184 280/775
3,580,636 A * 5/1971 Setto ........................ G05G 1/62 244/234
3,678,778 A * 7/1972 Groves .................. B62D 1/184 74/493
3,724,290 A * 4/1973 Burton ................... B62D 1/184 74/493
3,800,903 A * 4/1974 Beals ....................... B62D 1/18 74/494
4,158,968 A * 6/1979 Wilson ..................... G05G 9/04 180/332
4,261,282 A * 4/1981 Satou ...................... F16H 63/42 74/552
4,682,787 A * 7/1987 Ruhter ..................... B62D 1/18 280/775
4,733,745 A * 3/1988 Lumpkins ............. E02F 9/2004 280/775
4,821,837 A * 4/1989 Fifer ........................ B62D 1/18 280/775
4,934,208 A * 6/1990 Carlstrom .............. B60K 20/06 74/473.15
5,632,353 A * 5/1997 Kimberley ............. B60K 35/10 180/326
D556,790 S * 12/2007 Harber ........................... D15/28
8,505,646 B2 * 8/2013 Yamamoto ............. B60K 23/00 172/781
9,255,998 B2 * 2/2016 Phillips, III ......... G01V 1/0475
11,068,015 B2 * 7/2021 Ofenloch ................ F16H 61/24
2006/0042857 A1 3/2006 Catton et al.
2012/0152574 A1 6/2012 Harber et al.
2017/0275851 A1 9/2017 Huber et al.
2018/0282971 A1 10/2018 Yuan et al.

* cited by examiner

VIBRATOR SOURCE BASEPLATE ERGONOMIC CONTROL

BACKGROUND

Technical Field

Embodiments of the subject matter disclosed herein generally relate to land seismic source vehicles that are used in seismic data acquisition and, more particularly, to the placement and configuration of a controller in the seismic source vehicle for controlling the vibrator's baseplate, and enhancing health, safety, and environment (HSE) standards for such operations.

Discussion of the Background

Seismic data acquisition and processing generate a profile (image) of subterranean geophysical structures. While this profile does not provide an accurate location of oil and gas reservoirs, it suggests, to those trained in the field, the presence or absence of these reservoirs. Thus, providing a high-resolution image of the geophysical structures is an ongoing process. In addition, the seismic data collected during a survey may be used for determining subfloor locations for carbon capture and sequestration (which may be linked to the oil and gas development operations), estimate potential of geothermal reserves, and/or identify/estimate the presence/absence of other subsurface resources as minerals.

To obtain a high-resolution image of the underground, a seismic survey system employs a seismic source that generates seismic waves, and seismic receivers that record seismic signals associated with the seismic waves. The seismic source imparts energy to the ground. The energy travels through the subsurface and gets reflected from certain subsurface geological formations, e.g., reflectors or layers interface. The reflected energy travels back to the surface, where the seismic receivers record it. The recorded data is processed to yield information about the location and physical properties of the layers making up the subsurface.

For land explorations, the seismic source may be a vibratory source that is mounted on a truck for being carried at different locations where the seismic energy needs to be injected into the ground. The energy transmitted by the vibratory source to the ground is proportional with the force acting on it. For land seismic surveys, it is desirable to transmit as much energy as possible to the ground. Thus, the heavier the truck carrying the vibratory source, the more weight is available to keep the baseplate of the source in contact with the earth, enabling larger actuators to be used to drive the baseplate to transmit more vibratory energy into the earth.

Large hydraulic vibrators mounted on vehicle carriers equipped with tires or tracks are commonly used for geophysical exploration. Typically, a vehicle carrier 100, as illustrated in FIG. 1, moves to a pre-determined shot point 102. The carrier 100 uses a lift system 116 to lower a baseplate 118 that couples vibratory energy into the ground 120. A static hold-down force is also applied to the baseplate to preload it, using a portion of the vehicle weight so that during a sweep, the baseplate remains in good contact with the earth. The vibratory source 122 then generates a sweep that typically lasts for 8 to 16 s, but in some cases may be shorter or last up to 60 s, to produce a seismic signal 124 useful for illuminating subterranean features 126 (for example, an oil reservoir).

After the sweep is completed, the baseplate is raised, the vehicle moves up to the next shot point and the process is repeated. During a typical day of seismic acquisition, the vibrator spends a part of the acquisition time hammering the baseplate to transmit the energy to the earth. Large land vibrators in common use today are capable of full energy output over the range of about 7-90 Hz. Outside this band, the maximum deliverable vibratory force (ground force) is limited due to constraints imposed by limiting factors in the mechanical and/or hydraulic system. To generate this energy, the vibratory source 122 generates an up and down movement, which is mechanically transmitted to the baseplate 118. These up and down movements are applied to the baseplate only after the baseplate has been lowered to be in touch with the ground. In other words, while the vehicle carrier 100 travels from one site to another, the baseplate 118 is raised from ground. When the carrier 100 arrives at a given site, the baseplate 118 is lowered and then the vibratory source 122 generates the up and down movement. Lowering and raising the baseplate to prepare the source for shooting takes from the shooting time of the survey.

An existing controller, used by some operators, which controls the up and down movement of the baseplate is illustrated in FIG. 2 as element 210, and is being located between the driver seat and the passenger seat. It is noted that, with such solution, the driver 202, in order to operate the controller 210, needs to hold one hand on the driving wheel 204 and the other hand on the controller 210. FIG. 3 shows an alternative controller 210 (used by the assignee of this application), also located between the driver seat and the passenger seat, and having plural buttons 212 for moving the baseplate to a desired position, but also buttons 214 for moving the baseplate to full up or down positions or to indicate that the baseplate is in a ready to shoot position. The controller also controls the generation of the seismic energy, and its intensity. Because of its large size and weight, the controller 210 needs to be placed on the floor of the vehicle 100, as shown in FIG. 2, between the two front seats. Because the driver needs to watch the keyboard 216 when moving the baseplate, which includes the buttons 212 and 214, while sometimes driving, this poses a danger to the safety of the driver and the vehicle.

The driver needs to activate some of the buttons of the keyboard 216 while the carrier 100 is still moving, for the following reasons. The cost of a seismic survey is high and thus, the timing of the movements performed by the vehicle carrier needs to be efficient and short, to avoid time waste. One such efficiency is achieved by partially lowering the baseplate toward the ground while the vehicle is still moving, just prior to reaching its intended destination. In other words, the time to set the baseplate onto the ground can be reduced if instead of stopping the vehicle and then fully lowering the baseplate, the driver is capable to slowly lower the plate while the vehicle is still moving, and then achieve the final contact between the baseplate and the ground when the vehicle is stationary. In this way, the time necessary to lower the baseplate onto the ground while the vehicle is stationary is reduced, but this is detrimental to the safe driving of the truck and also not ergonomically optimized.

Another problem with the existing controllers is that the keyboard 216 sometimes fails, which requires stopping the seismic data acquisition process until the entire controller is replaced. This is not only expensive but is also time-consuming while in the middle of the survey. To partially alleviate these problems, Sercel, the assignee of this application, has proposed the improvement shown in FIGS. 4A and 4B, i.e., attaching two movable arms 410 and 412 to the steering wheel column 402, with a connecting ring 420. The first arm 410 was configured to lower the baseplate and the second arm 412 was configured to indicate that the baseplate is in the ready to shoot position. The two arms were connected through a wire 414 to the controller 210. In this way, the driver of the vehicle can activate the two arms without the need to directly look at the keyboard 216 of the controller 210.

However, even this approach has its limitations as only two functions of the controller are at the fingertip of the driver, the keyboard still can fail, and the driver still needs to use the keyboard for the other functionalities offered by the controller. Thus, there is a need for further improving the reach of the keyboard of the controller to overcome the problems mentioned above with regard to the vehicle carrier.

SUMMARY

According to an embodiment, there is a vibratory source for generating seismic signals that is carried by a vehicle carrier. The vibratory source includes a baseplate and a lift and hydraulic actuator system configured to actuate the baseplate to impart seismic waves into the ground. The baseplate is controlled by a controller located next to the driver. Instead of having the plural functionalities offered by the controller accessed by a keyboard located on the controller, one or more embodiments discussed herein disclose a remote mechanism for controlling the controller, and the remote mechanism is attached to the steering wheel column and in reach by the driver without requiring a view of the controller. In this way, the HSE of the entire operation is enhanced.

According to an embodiment, there is a remote control system for a vibratory seismic source that generates seismic signals. The remote control system includes an attachment mechanism configured to be fixedly attached to a component of a vehicle carrier that carries the vibratory seismic source, and a remote control mechanism supported by the attachment mechanism, wherein the remote control mechanism includes first and second command units, each configured to control a baseplate associated with the vibratory seismic source. Each of the first and second command units are configured to be removed from the remote control mechanism while the attachment mechanism is hold in place.

According to another embodiment, there is a vibratory seismic source regulator system for controlling a vibratory seismic source, and the vibratory seismic source regulator system includes a controller configured to control the vibratory seismic source for generating seismic signals, and a remote control system configured to remotely control the controller. The remote control system includes an attachment mechanism configured to be fixedly attached to a component of a vehicle carrier that carries the controller, and a remote control mechanism supported by the attachment mechanism, where the remote control mechanism includes first and second command units, each configured to control a baseplate associated with the vibratory seismic source. Each of the first and second command units are configured to be removed from the remote control mechanism while the attachment mechanism is hold in place.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
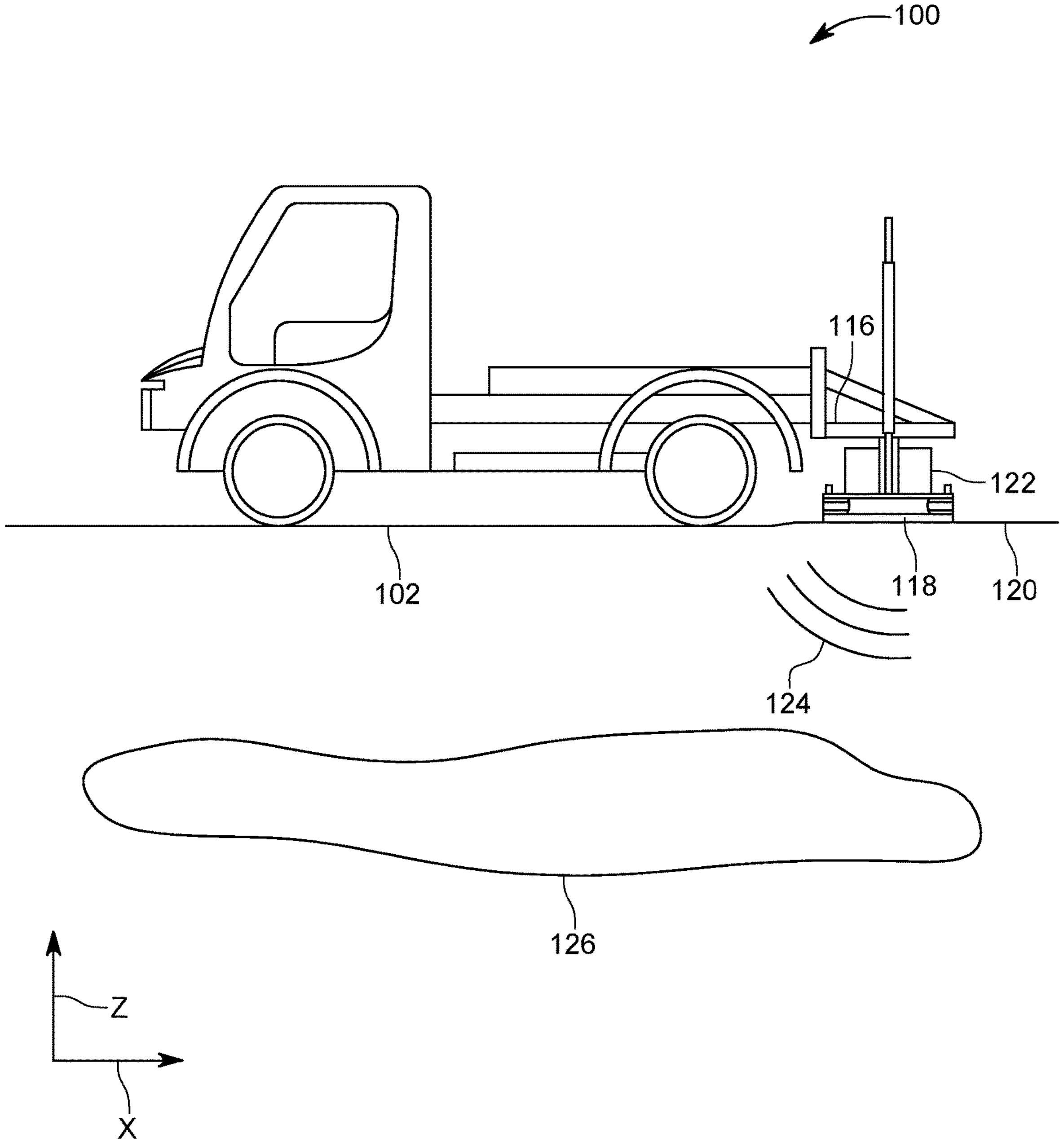
FIG. 1 (BACKGROUND ART)
FIG. 1 is a schematic diagram of a truck-mounted vibratory source.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source mounted on a truck. However, the embodiments to be discussed next are not limited to a truck or a vibratory source, but may be applied to other sources used to generate seismic waves, even if not mounted on a truck, or to other vehicles.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

According to an embodiment, there is a remote mechanism that is attached to the controller, in a wired or wireless manner, and is configured to access part or all the functionalities of the controller. The remote mechanism is placed so that the driver can reach it without taking her or his eyes from the path followed by the vehicle. Thereby, security and safety are optimized, both for driver and environment. In one application, the remote mechanism completely replaces the keyboard traditionally located on the exterior casings of the controller. The remote mechanism may be removably attached to the steering wheel column with an attachment mechanism. Both remote mechanism and attachment mechanism are eco-designed, with elements which can easily be disassembled for easy recycling. In one application, the attachment mechanism is adjustable, i.e., its position and/or orientation relative to the steering wheel column can be changed as desired. This allows for the best ergonomics for the driver, improving HSE conditions. The remote mechanism together with the attachment mechanism may be retroactively added to the existing vehicles, no matter the manufacturer of the vehicle. More details of the various implementations of the remove mechanism are now discussed with regard to the figures.

Figure 5:
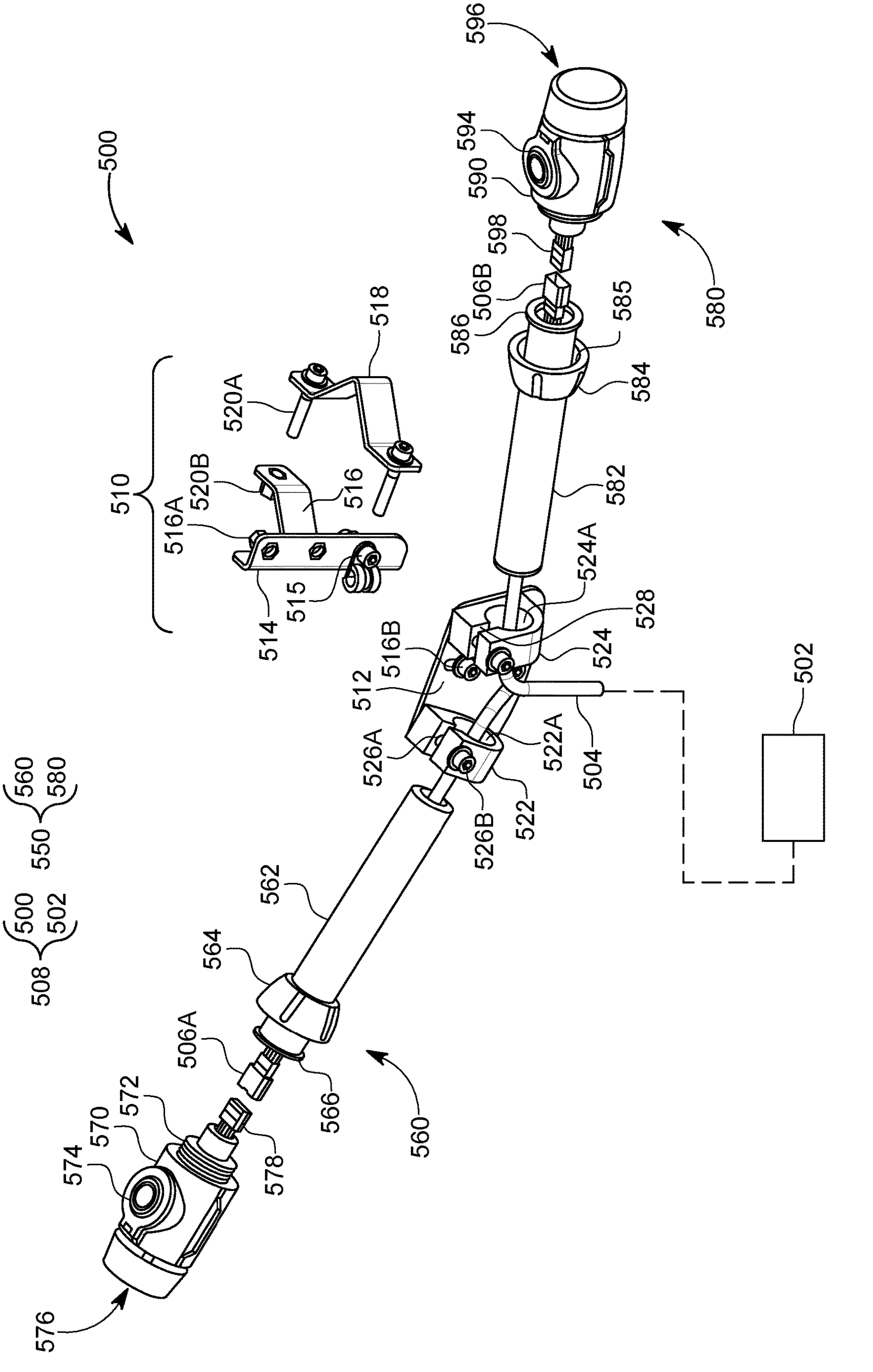
FIG. 5 illustrates a remote control system attached to a steering column for driving in a wired manner the controller of the seismic source.

In one embodiment, as illustrated in FIG. 5, a remote control system 500 is configured to be attached to the steering wheel column (not shown in this figure) of a vehicle with the attachment mechanism 510. The attachment mechanism 510 is configured to hold a remote control mechanism 550, which includes a first remote mechanism part 560 and a second remote mechanism part 580. The attachment mechanism 510 is configured to fixedly hold the remote control mechanism 550 attached to the steering wheel column at a desired height and with a desired inclination, as discussed later.

The attachment mechanism 510 includes a base platform 512, made for example, from a metal, steel, or composite material, and which constitutes the base to which all the other elements are attached. The base platform 512 may be shaped as a plate, or any other shape. The base platform 512 is configured to mate with a column platform or arm support 514, which is configured to be directly attached to the steering wheel column. One or more bolts 516A and corresponding nuts 516B may be used to attach the base platform 512 to the column platform 514. In one application, the column platform 514 is selected to be a flat plate to perfectly mate with the base platform 512. Attached to the column platform 514 (for example, by welding or by a bolt and nut 515), there is a first clamp 516, which is bent so that it conforms to the shape of the steering wheel column. A mating second clamp 518 is configured to be attached to the first clamp, for example, with bolts 520A and nuts 520B, so that the two clamps fully encircle the steering column. By tightening the nuts 520B, the first and second clamp form a fixed collar around the steering column, thus achieving a fixed base platform 512, which constitutes the base for all other components.

For attaching the remote control mechanism 550 to the attachment mechanism 510, first and second pipe clamps 522 and 524 are provided. The first and second pipe clamps 522 and 524 are fixedly attached to opposite ends of the base platform 512 with corresponding bolts 526A and nuts 526B (only one referenced for simplicity). Note that these bolts and nuts not only fixedly attach the first and second pipe clamps to the base platform 512, but they also tighten a corresponding gap 528 formed in each clamp so that when a component of the remote control mechanism 550 enters inside the pipe clamp, it can be fixed relative to the pipe clamp. In other words, each pipe clamp 522 and 524 has a corresponding bore 522A and 524A, which is configured to receive a component of the control mechanism 550, and to fix that component relative to the base platform 512.

Figure 2:
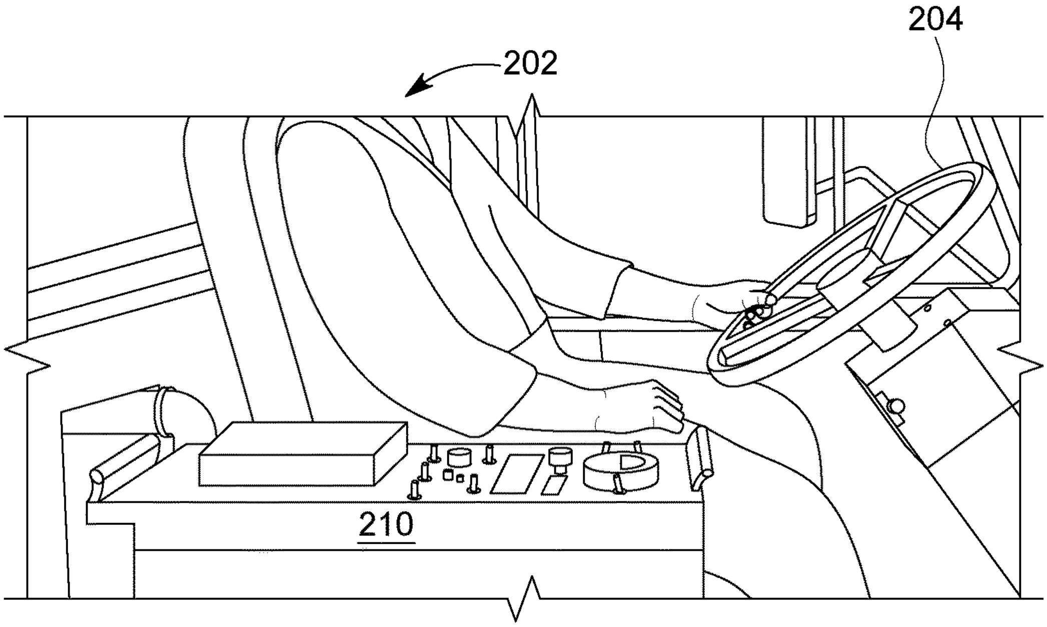
FIG. 2 (BACKGROUND ART)
FIG. 2 is a schematic diagram of a controller for moving the baseplate of the truck-mounted vibratory source.
Figure 3:
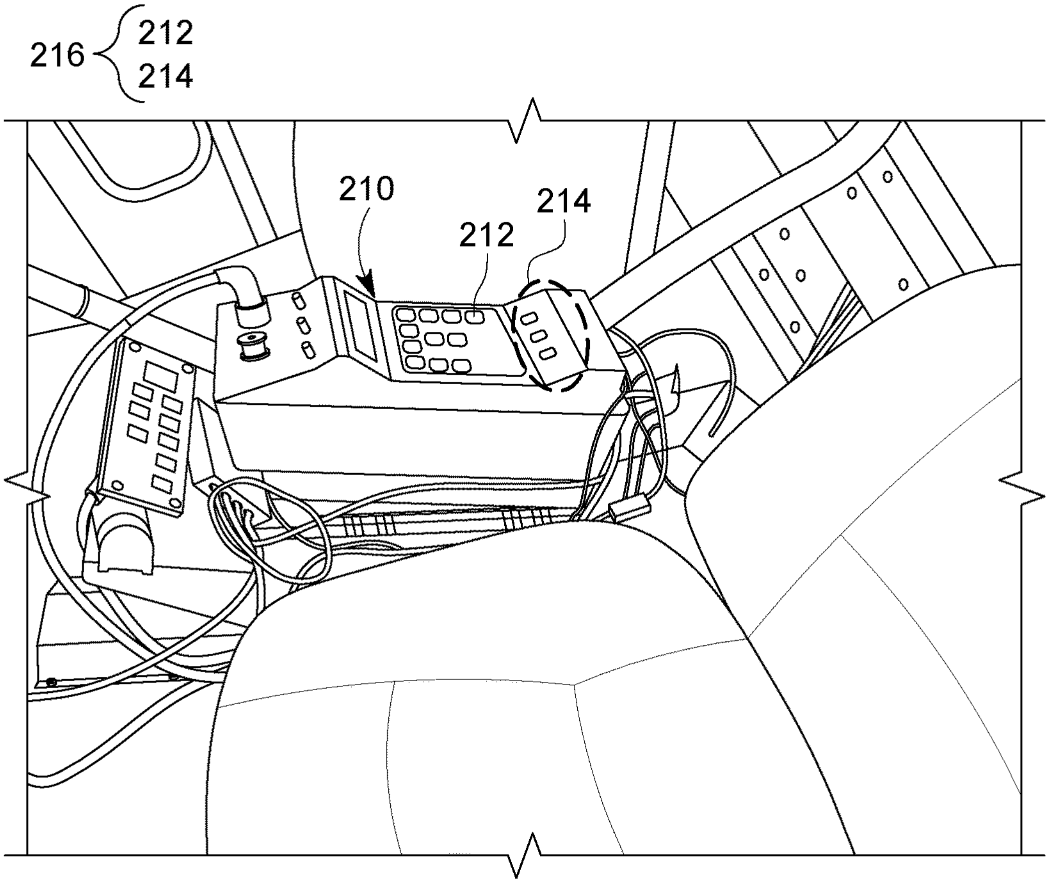
FIG. 3 (BACKGROUND ART)
FIG. 3 illustrates the controller and an associated keyboard used by the driver of the vehicle for activating various functionalities of the vibratory source.
Figure 4A:
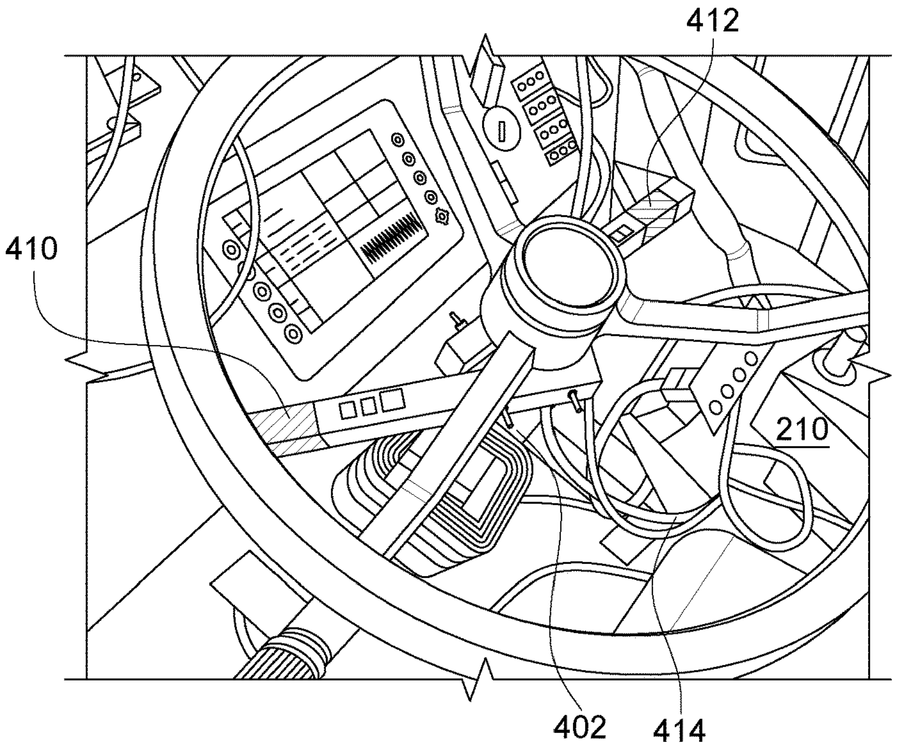
FIG. 4A (BACKGROUND ART)
FIGS. 4A and 4B illustrate a two-function remote control device attached to the steering wheel column and configured to control the controller.
Figure 4B:
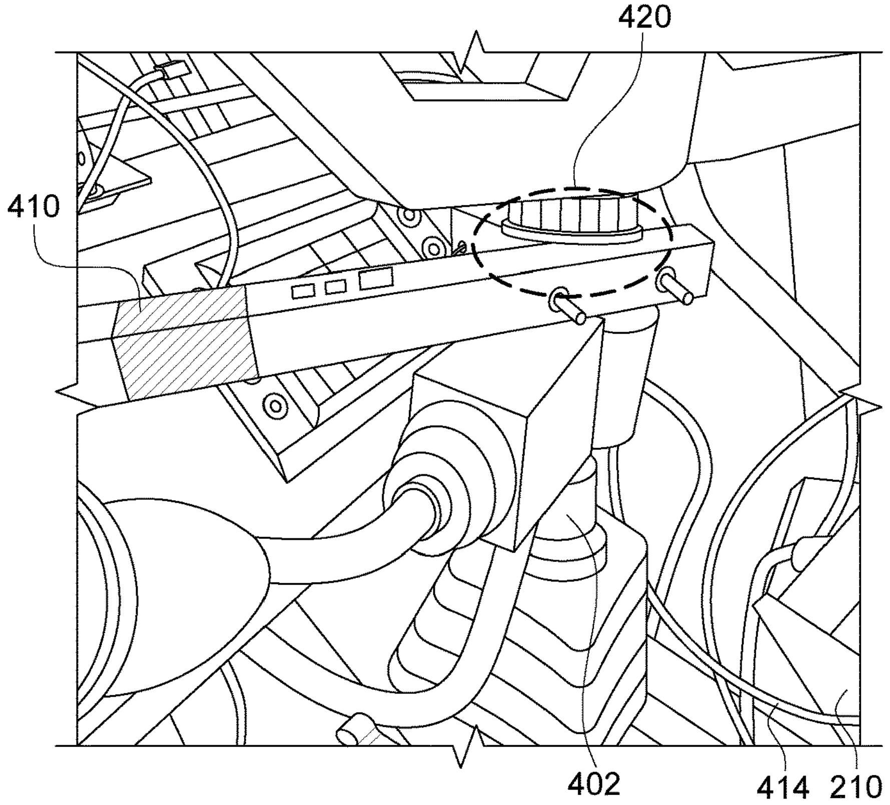
FIG. 4B (BACKGROUND ART)

The remote control mechanism 550 includes in this embodiment a first remote control part 560 and a second remote control part 580. Other parts may be added if desired. The first remote control part 560 includes a pipe 562 that is configured to fit inside the bore 522A of the first pipe clamp 522. By tightening the bolt 526B, the pipe 562 can be fixedly attached to the attachment mechanism, and effectively to the steering column. Thus, the pipe 562 is fixed relative to the steering column, i.e., it does not move relative to it. A floating nut 564 is provided over the pipe 562 and the floating nut has internal threads (not visible in the figure). The floating nut 564 can move along the pipe 562 but is prevented by a shoulder 566 of the pipe from leaving the pipe. The shoulder 566 also secures the command unit 570's position (orientation) relative to pipe 562 when the floating nut 564 engages the threads 572 of the command unit 570, as the command unit 570 and the pipe 562 clamp the shoulder 566. A command unit 570 is configured to be fixedly attached to the pipe 562 with the floating nut 564. In this respect, the command unit 570 has its own threads 572, that are mating with the threads of the floating nut 564. The command unit 570 includes at least one control element 574, for example, a button or joystick or switch or knob or any means for initiating or activating a corresponding functionality of a controller 502, which directly controls the vibratory source. Note that the controller 502 does not have any buttons or keyboard on it in this embodiment, which is different from the controller 210 shown in FIGS. 2 and 3. In other words, the command unit 570 and another command unit 590 (which is discussed later) exclusively control the controller 502. In this embodiment, the remote control system 500 and the controller 502 form a seismic vibratory source regulator system 508.

FIG. 5 shows the command unit 570 having two control elements 574 and 576, each being assigned a corresponding function, for example, the control element 576 is responsible for pushing down the baseplate and the control element 574 is responsible for the "ready to shoot" command. One skilled in the art would understand that more than two control elements may be placed on the command unit. As the seismic survey can take place under conditions where the outside light is poor, the control elements 574 and 576 may include an LED (not shown), for illumination. The command unit 570 may be easily removed/replaced in case that it fails, as only the floating nut 564 needs to be undone. The electrical contact between the command unit 570 and the controller is achieved in this embodiment with a direct electrical harness 504. The harness 504 is attached with one end directly to the controller 502 and the other end is split into two, a first end that terminates with a first electrical connection 506A for the command unit 570, and a second electrical connection 506B for the command unit 580. The command unit 570 has a mating electrical connection 578 that removably connects to the first electrical connection 506A. Thus, replacing the command unit 570 is simplified, it can take place in the field, and can be performed by the driver of the vehicle, which greatly reduces the fixing time and the cost. Note that pipes 562 and 582 have internal bores that are configured to pass the corresponding electrical connections 506A and 506B. However, to prevent these electrical connections from entering the pipes 562 and 582 when the electrical connections are disconnected from their mating electrical connections 578 and 598, respectively, a connection lock (not shown), having a diameter larger than the diameter of the internal bores of the pipes 562 and 582, may be placed over each of the electrical connections.

In addition, the control elements 574 and 576 are conveniently and ergonomically placed in the easy reach of the driver and the driver does not have to look away from the driving path for reaching these control elements. Further, the position and orientation of the control elements 574 and 576 may be adjusted by moving the base platform 512 up or down along the steering column, or the tilt may be adjusted by changing the orientation of the pipe clamp 522. In this regard, note that the pipe clamp 522 may be rotated relative to the base platform 512. Also, the individual height adjustment for each control unit 560 and 580 is possible by adjusting the amount of the pipe 562 that enters inside the bore 522A. All these features and advantages are also applicable to the second remote control part 580, which similarly includes a pipe 582, floating nut 584 with an internal thread 585, second control unit 590 having corresponding control elements 594 and 596, and electrical connection 598. Note that the electrical harness 504 is located inside the pipes 562 and 582 and thus protected from interference with the driving wheel. The control elements 596 and 594 may be associated with the plate up command and plate travel length toggle command, respectively. Note that the toggle command 594 allows the driver to only partially move up the plate. This may save time when the ground on which the vehicle 100 travels is very flat and thus, the plate can be only partially moved up (not fully moved up).

Figure 6A:
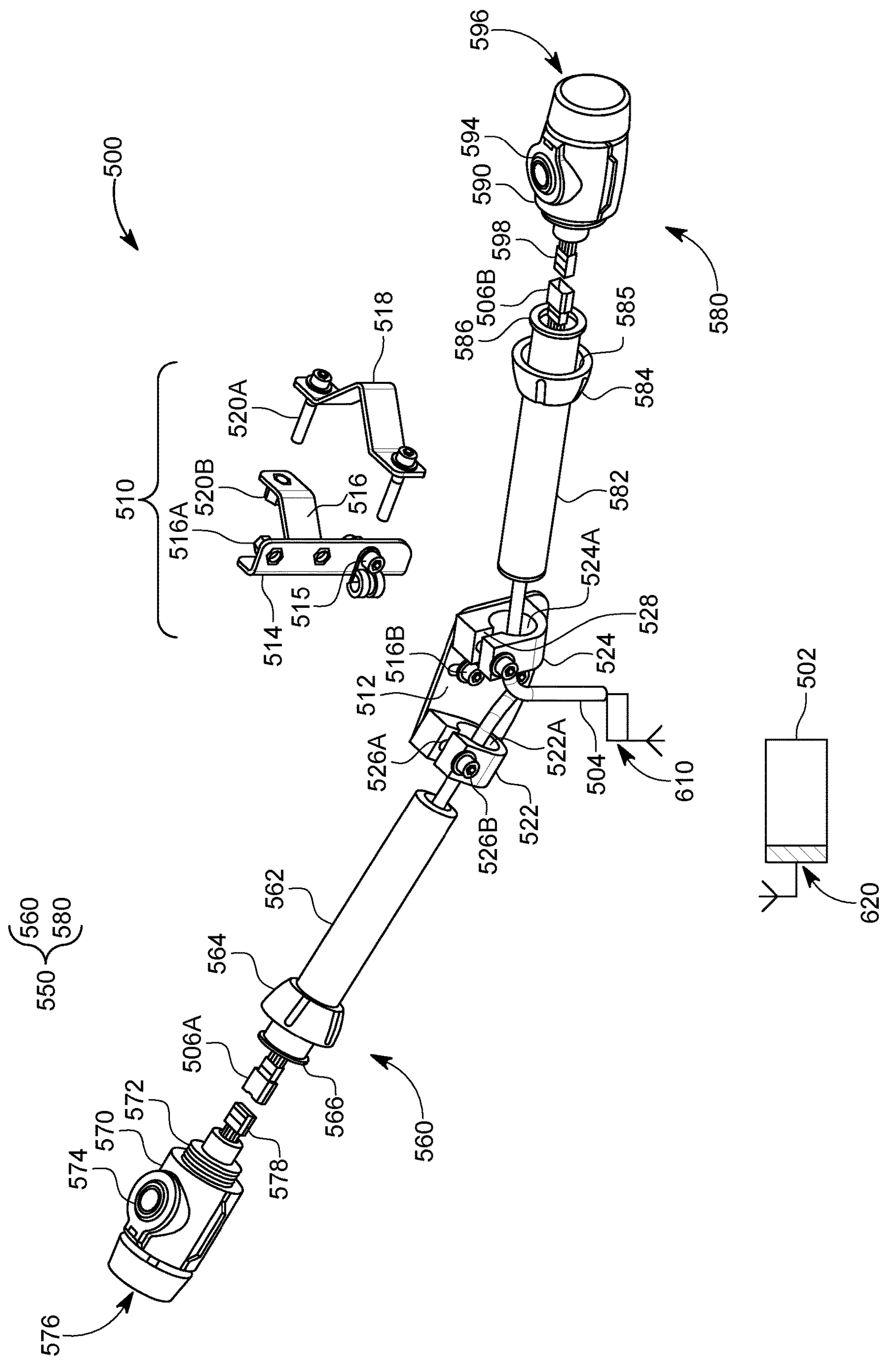
FIG. 6A illustrates one implementation of a remote control system attached to a steering column for driving in a wireless manner the controller of the seismic source.

FIG. 6A shows an alternative embodiment in which the remote control system 500 is implemented in a wireless manner. More specifically, an end of the electrical harness 504 is attached to a wireless communication module 610 while the controller 502 is attached to a counterpart wireless communication module 620. The two wireless communication modules 610 and 620 are configured to communicate in a wireless manner by any known means, for example, any known radio frequency, sound, optical, etc. While the wireless communication module 610 is shown in the figure extending outside the base platform 512, in one application it can be placed between the pipe clamps 522 and 524 to be protected and to minimize the footprint of the system 500. In this way, no wires extend from the steering column to the controller 502. In one variation of this implementation, the wireless communication module 620 may be independent of the controller 502, i.e., the vehicle has its own wireless network implemented by the module 620, and the controller 502 has its own wireless module to connect to the module 620. In this case, the module 620 is configured to wireless connect other elements of the vibratory source to the system 500.

Figure 6B:
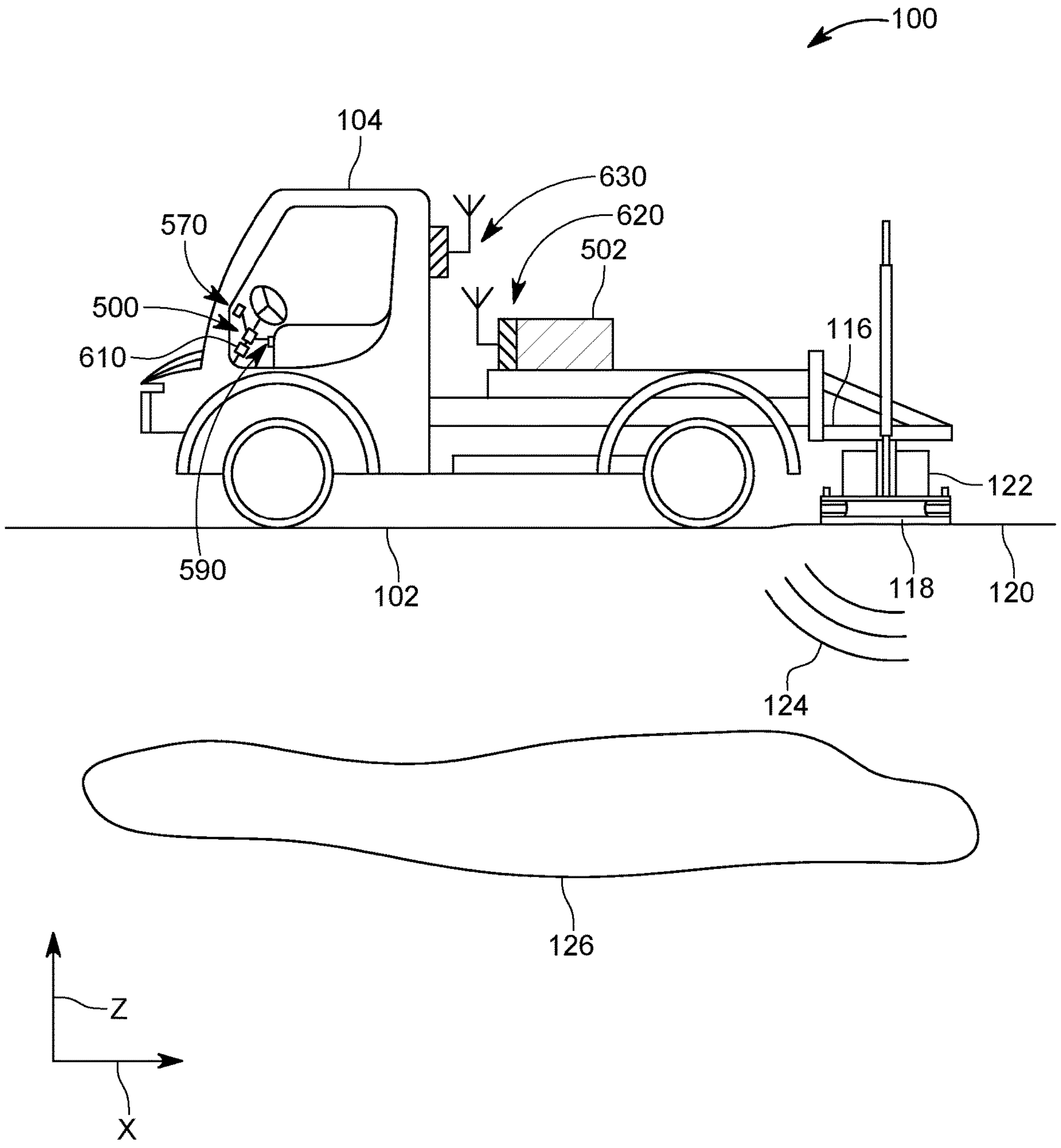
FIG. 6B illustrates another implementation of a remote control system attached to a steering column for driving in a wireless manner the controller of the seismic source.

Because there is no keyboard on the controller 502 in these embodiments, and because the remote control system 500 can wirelessly connect to the controller 502, in one embodiment, as illustrated in FIG. 6B, the entire controller 502 may be placed either away from the cab 104 in which the driver is located, or below the floor in the cab, i.e., not in direct reach of the driver. In this case, the vehicle may have a central wireless communication module 630 that is configured to communicate in any known wireless mode with both the first wireless communication module 610 of the system 500 and the second wireless communication module 620 of the controller 502. In one application, the controller 502 may still be placed in the cabin, but not in direct reach of the driver. No matter which implementation is selected, a magnetic breaker associated with the controller 502 may be placed in the driver's reach as the magnetic breaker is a safety feature for cutting off the movement of the baseplate in case of malfunction.

Figure 7A:
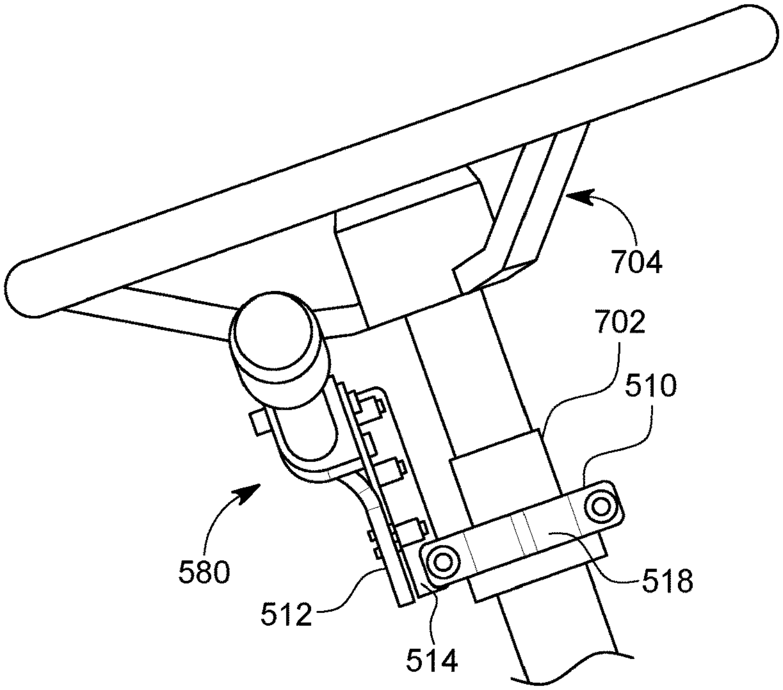
FIGS. 7A and 7B show side and front views of one configuration of the remote control system attached to the steering column of a vehicle.
Figure 7B:
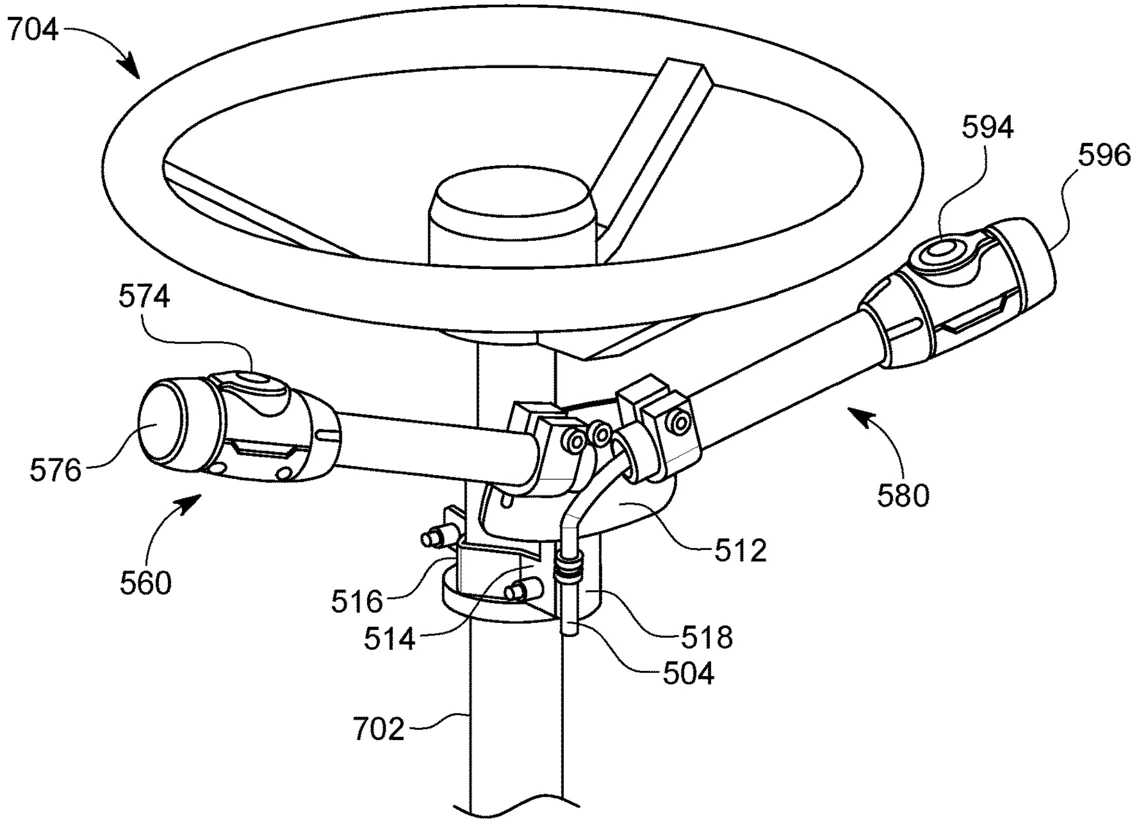
Figure 8A:
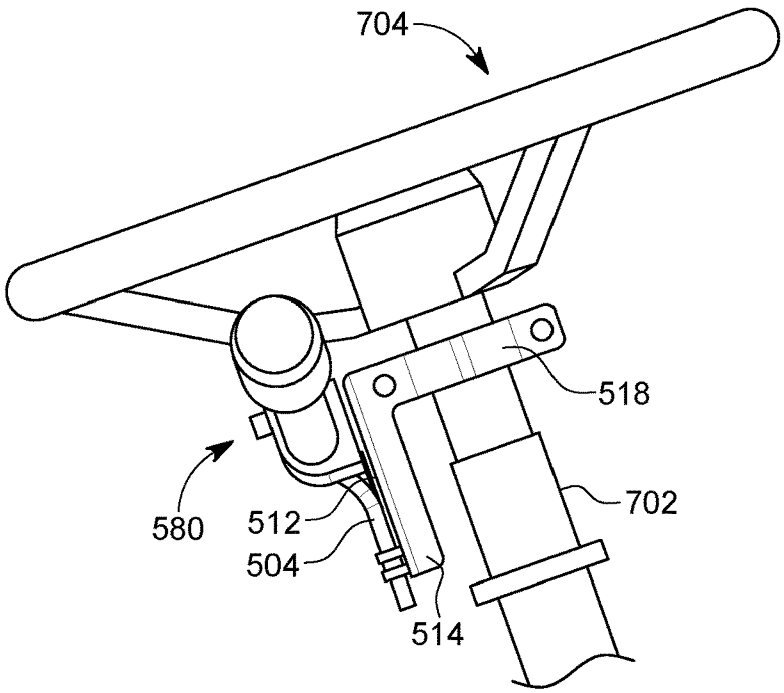
FIGS. 8A and 8B show side and front views of another configuration of the remote control system attached to the steering column of a vehicle.
Figure 8B:
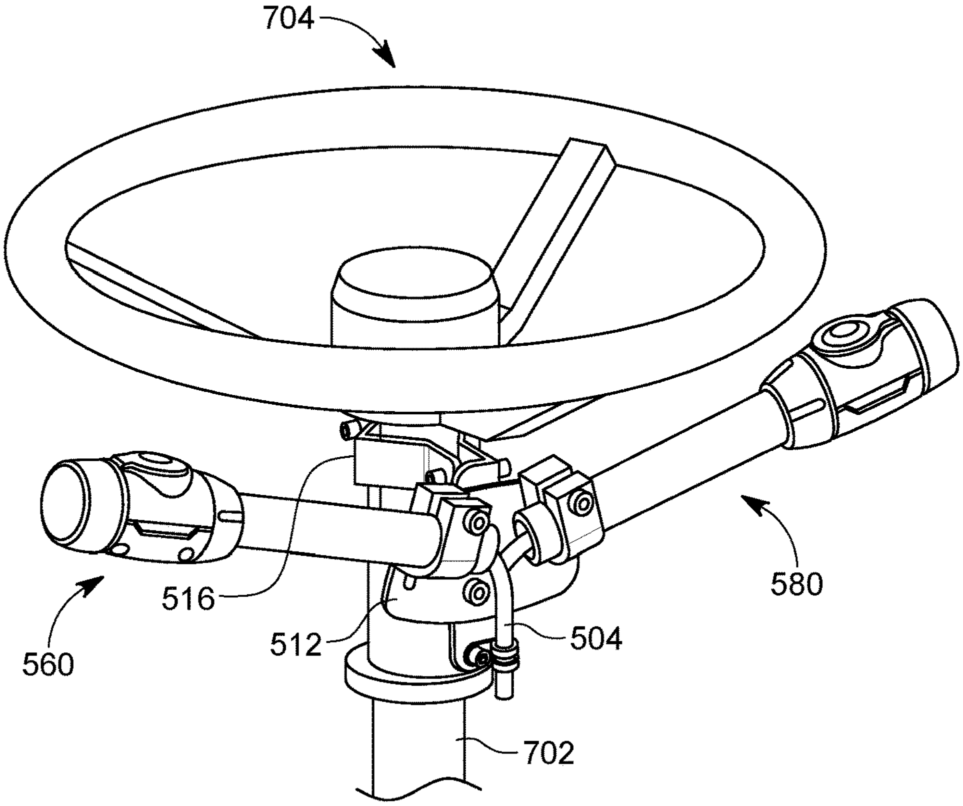
Figure 9A:
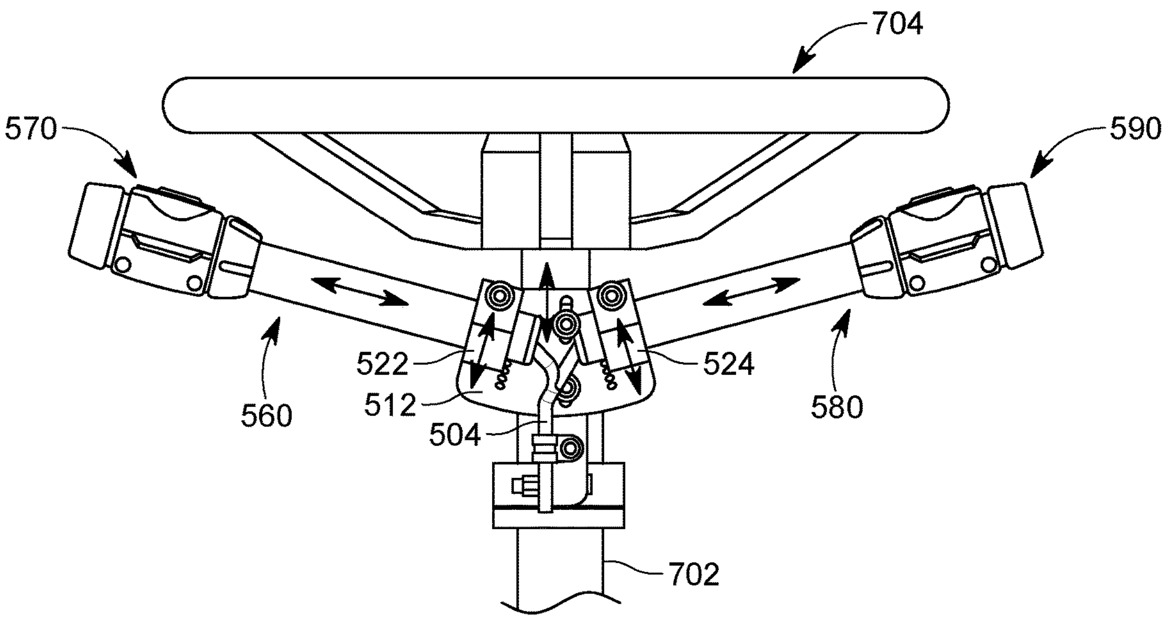
FIGS. 9A and 9B illustrate the various degrees of freedom of the remote control system attached to the steering column.
Figure 9B:
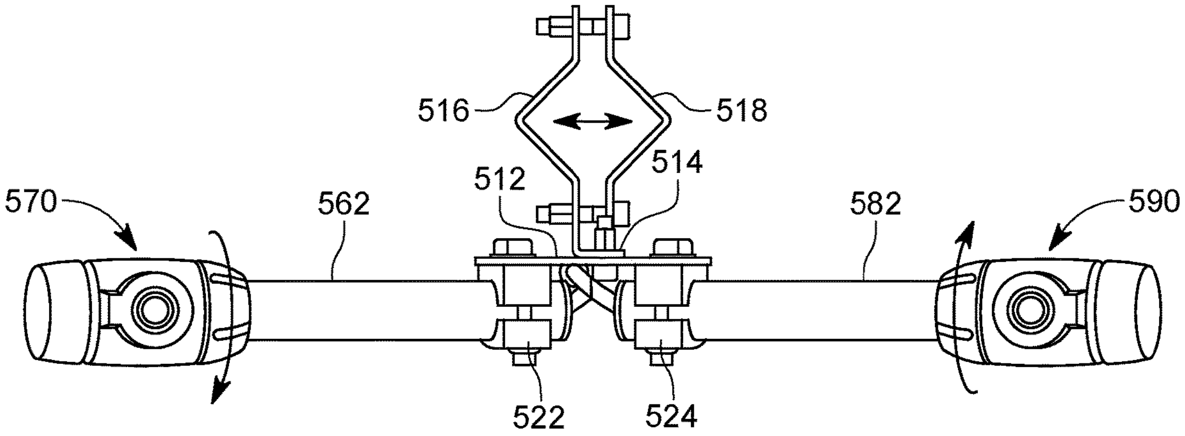

A side and front view of the system 500, when attached to a steering wheel column 702 of the vehicle 100 is shown in FIGS. 7A and 7B. These figures also show the steering wheel 704, and the first clamp 516 being directly attached to the column 702, at the bottom of the column platform 514. An alternative of this configuration is shown in FIGS. 8A and 8B, where the first clamp 516 is located at the top of the column platform 514. By changing the location of the first clamp relative to the column platform, a height of the remote control mechanism 550 can be adjusted. FIG. 9A shows the various adjustments that may be made to the elements of the remote control system 500, i.e., moving up and down the base platform 512, moving up and down the pipe clamps 522 and 524, and moving out and in the pipes 562 and 582. Each of these movements are illustrated by a corresponding arrow in the figure, and each of these movements may be performed independent of the other movements. FIG. 9B is a top view of the system 500 and shows with arrows the possible adjustments of the command units 570 and 590 relative to the fixed attachment mechanism 510. In other words, the orientation of the command units may be adjusted so that the command elements can point in any desired direction relative to the longitudinal axis of the pipes 562 and 582.

Figure 10:
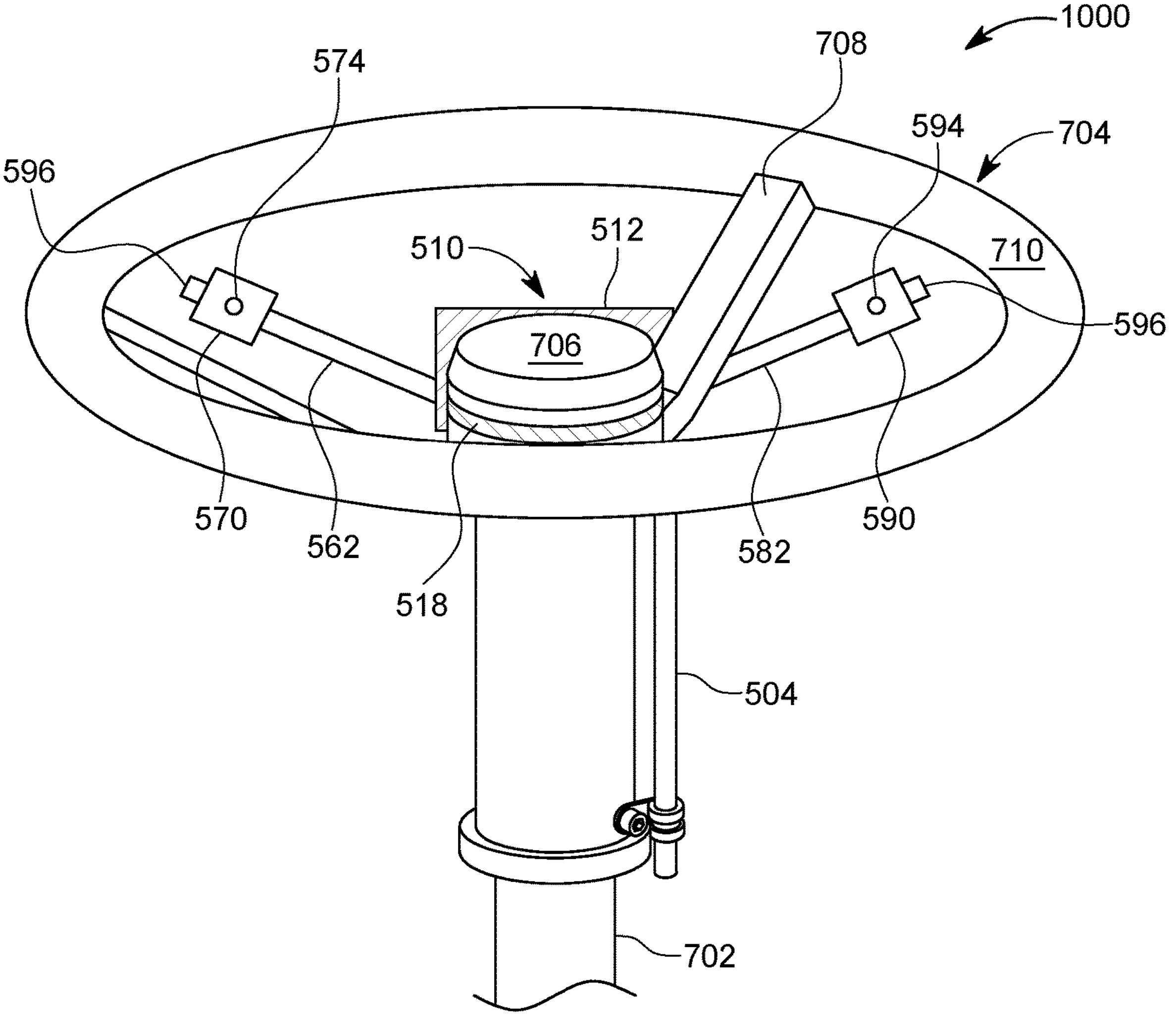
FIG. 10 illustrates the remote control system attached to the steering wheel of the vehicle.

In another embodiment, the location of the remote control system may be changed, for example, as shown in FIG. 10, so that the remote control system 1000 is placed directly on the wheel 704 instead of the steering column 702. For this embodiment, all the components of the system 500 are also found in the system 1000. Because the system 1000 is directly attached to the steering wheel 704, the pipes 562 and 582 and the command units 570 and 590 turn with the wheel. Note that for the embodiment illustrated in FIGS. 7A to 9B, the system 500 is fixed, i.e., it does not turn when the steering wheel 704 turns. While FIG. 10 shows the system 1000 being attached to the hub 706 of the steering wheel 704, it is possible to attach it to one or more spokes 708 of the steering wheel 704, or even directly to the body 710 of the steering wheel 704. The implementation shown in this figure may be made with the wired configuration shown in FIG. 5 or with the wireless configuration shown in FIGS. 6A and 6B.

Figure 11:
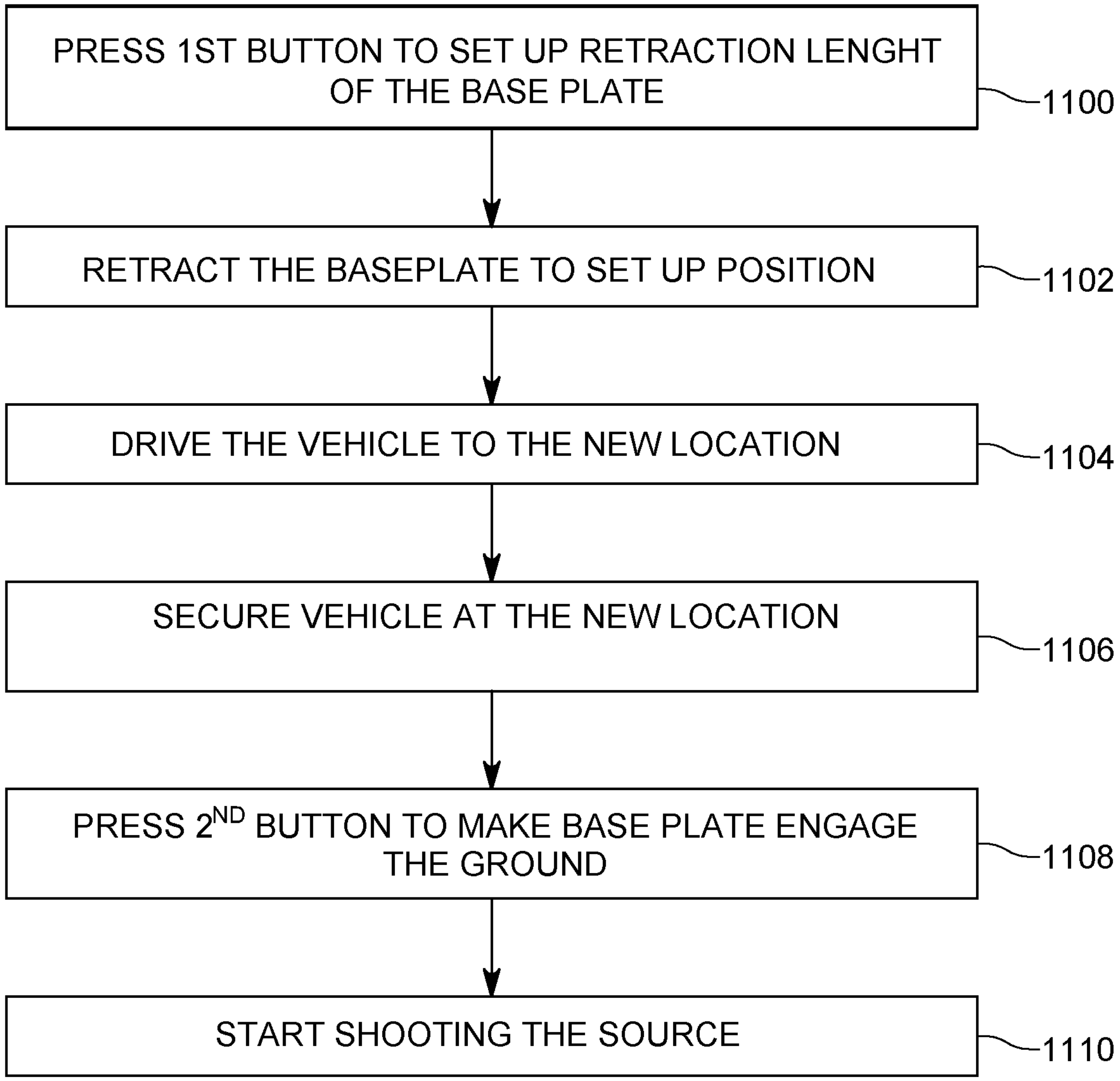
FIG. 11 is a flowchart of a method for using the remote control system with a vehicle that carries the vibratory seismic source.

A method for using the remote control system 500 is now discussed with regard to FIG. 11. Assume that the vehicle 100 just finished shooting the vibratory seismic source 122 at a given location and the driver needs to move to a new shooting location 102. The driver of the vehicle, based on the terrain conditions between the current location and the new location, activates in step 1100 the first control element 594 for setting a partial moving up path of the baseplate 118. This means that the driver has decided that because the terrain is pretty flat, there is no need to fully retract the baseplate 118, and thus, with the first control element 594, the driver set up a partial length to retract the plate. Then, the driver of the vehicle activates in step 1102 the second control element 596 to effectively retract the baseplate to the desired partial length, and then drives the vehicle toward the new location 102 in step 1104. Note that pressing the control elements 574, 576, 594, or 596 does not require the driver to look at the controller 502, i.e., the driver maintains his or her eyes on the vehicles' path while initiating the retraction of the baseplate, which makes this invention to enhance the HSE of the operation of the truck. Once the vehicle has arrived at the new location, the driver secures the vehicle in step 1106 at the new location, and then activates a second control element 576 in step 1108, to make the baseplate contact the ground. When the baseplate has firmly engaged the ground the vibratory seismic source is ready to shoot. Then, in step 1110, either the driver initiates the shooting of the source, or the controller automatically initiates the shooting as the baseplate is in full contact with the ground. Note that all these different buttons are part of the remote control system 500, which is fixed either onto the steering column or onto the steering wheel and the driver at no time touches the controller 502. Also note that the driver, while pressing any of these buttons, does not need to turn her or his eye toward the controller 502.

The disclosed embodiments provide a remote control system for a controller of a seismic source having a baseplate, which is mounted on a vehicle carrier, and the remote control system is configured to provide various functionalities associated with the baseplate and the entire seismic source, which are safer for the driver. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A remote control system for a vibratory seismic source that generates seismic signals, the remote control system comprising:

an attachment mechanism configured to be fixedly attached to a component steering column of a vehicle carrier that carries the vibratory seismic source; and a remote control mechanism supported by the attachment mechanism, wherein the remote control mechanism includes:

first and second command units, each configured to control a baseplate associated with the vibratory seismic source, first and second pipes fixedly attached to the attachment mechanism, and first and second floating nuts located around the first and second pipes, respectively, wherein the first pipe includes a shoulder configured to secure an orientation of the first command unit relative to the first pipe when the first floating nut engages the first command unit;

wherein each of the first and second command units are configured to be removed from the remote control mechanism by disengaging the first and second floating nuts while the attachment mechanism is held in place.

2. The system of claim 1, further comprising:

an electrical harness that extends through the first and second pipes and has first and second electrical connections, wherein the first and second command units have first and second electrical connections, respectively, which are configured to mate to the first and second electrical connections of the electrical harness.

3. The system of claim 1, wherein an angular direction and a tilt of the first and second command units are adjustable with the first and second floating nuts.

4. The system of claim 1, wherein the attachment mechanism comprises:

a base platform and clamps for fixedly attaching the base platform to a steering column of the vehicle that carries the vibratory seismic source; and first and second pipe clamps attached to the base platform.

5. The system of claim 4, wherein the first pipe clamp is configured to receive the first pipe and the second pipe clamp is configured to receive the second pipe so that a length of the first and second pipes relative to the base platform is adjustable.

6. The system of claim 1, wherein the first command unit includes two or more command elements, each command element being configured to actuate a functionality of the vibratory seismic source.

7. The system of claim 6, wherein the second command unit includes two or more command elements, each command element being configured to actuate additional functionalities of the vibratory seismic source.

8. The system of claim 7, wherein the first and second command units fully control a controller of the vibratory seismic source.

9. The system of claim 1, further comprising:

a wireless communication module configured to communicate in a wireless manner with a controller of the vibratory seismic source.

10. A vibratory seismic source regulator system for controlling a vibratory seismic source, the vibratory seismic source regulator system comprising:

a controller configured to control the vibratory seismic source for generating seismic signals; and a remote control system configured to remotely control the controller, wherein the remote control system includes, an attachment mechanism configured to be fixedly attached to a component steering column of a vehicle carrier that carries the controller; and a remote control mechanism supported by the attachment mechanism, wherein the remote control mechanism includes:

first and second command units, each configured to control a baseplate associated with the vibratory seismic source, first and second pipes fixedly attached to the attachment mechanism, and first and second floating nuts located around the first and second pipes, respectively, wherein the first pipe includes a shoulder configured to secure an orientation of the first command unit relative to the first pipe when the first floating nut engages the first command unit, wherein each of the first and second command units are configured to be removed from the remote control mechanism by disengaging the floating nuts while the attachment mechanism is held in place.

11. The system of claim 10, further comprising:

an electrical harness that extends through the first and second pipes and has first and second electrical connections at one end and is connected to the controller at another end, wherein the first and second commands have first and second electrical connections, respectively, which are configured to engage the first and second electrical connections of the electrical harness.

12. The system of claim 10, wherein an angular direction and/or a tilt of the first and second command units are adjustable with the first and second floating nuts.

13. The system of claim 11, wherein the attachment mechanism comprises:

a base platform and clamps for fixedly attaching the base platform to a steering column of the vehicle; and first and second pipe clamps attached to the base platform.

14. The system of claim 13, wherein the first pipe clamp is configured to receive the first pipe and the second pipe clamp is configured to receive the second pipe so that a length of the first and second pipes relative to the base platform is adjustable.

15. The system of claim 10, wherein the first command unit includes two or more command elements, each command element being configured to actuate a functionality of the vibratory seismic source.

16. The system of claim 15, wherein the second command unit includes two or more command elements, each command element being configured to actuate additional functionalities of the vibratory seismic source.

17. The system of claim 16, wherein the first and second command units fully control the controller of the vibratory seismic source as the controller has no keyboard.

18. The system of claim 10, wherein the remote control mechanism includes a first wireless communication module and the controller includes a second wireless communication module, which is configured to communicate in a wireless manner with the first communication module.

* * * * *